United States Patent
Al-Yafawi et al.

(10) Patent No.: US 10,392,123 B2
(45) Date of Patent: Aug. 27, 2019

(54) ON-BOARD INERT GAS GENERATING AIR SEPARATION MODULE RECOVERY APPARATUS AND METHOD

(71) Applicant: Carleton Life Support Systems Inc., Davenport, IA (US)

(72) Inventors: Abdullah Al-Yafawi, North Liberty, IA (US); William Vestal, Milan, IL (US)

(73) Assignee: Carleton Life Support Systems, Inc., Davenport, IA (US)

( * ) Notice: Subject to any disclaimer, the term of this patent is extended or adjusted under 35 U.S.C. 154(b) by 146 days.

(21) Appl. No.: 15/481,870

(22) Filed: Apr. 7, 2017

(65) Prior Publication Data

US 2017/0305576 A1    Oct. 26, 2017

Related U.S. Application Data

(60) Provisional application No. 62/325,177, filed on Apr. 20, 2016.

(51) Int. Cl.
*B01D 53/02* (2006.01)
*B64D 37/32* (2006.01)
(Continued)

(52) U.S. Cl.
CPC .............. *B64D 37/32* (2013.01); *B01D 53/22* (2013.01); *B01D 53/30* (2013.01); *B01D 63/02* (2013.01);
(Continued)

(58) Field of Classification Search
CPC .......... B01D 2053/224; B01D 2256/10; B01D 2259/4575; B01D 53/22; B01D 53/30; B01D 63/02; B64D 37/32; B64F 5/30
See application file for complete search history.

(56) References Cited

U.S. PATENT DOCUMENTS

| | | |
|---|---|---|
| 4,544,388 A | 10/1985 | Rao et al. |
| 4,793,832 A | 12/1988 | Veltman et al. |
| | (Continued) | |

FOREIGN PATENT DOCUMENTS

| | | |
|---|---|---|
| EP | 1463578 | 9/2011 |
| EP | 2369146 | 9/2011 |

OTHER PUBLICATIONS

Al-Obeidani, S., et. al., Chemical Cleaning of Oil Contaminated Polyethylene Hollow Fiber Microfiltration Membranes, Journal of Membrane Science, vol. 307, Issue 2, Jan. 15, 2008, pp. 299-308.
(Continued)

*Primary Examiner* — Christopher P Jones
(74) *Attorney, Agent, or Firm* — Woods Oviatt Gilman LLP; Katherine H. McGuire, Esq.

(57) ABSTRACT

A method of recovering performance of an air separation module (ASM) is described. A recovery system includes an air source providing inlet air, a filter to output clean air and a heater heating the air. The ASM is coupled to the system and comprises a hollow fiber membrane to output nitrogen enriched air (NEA) exhaust. The method comprises operating the system with the air source and heater in a default condition; measuring an initial purity of NEA exhaust; adjusting the air source and/or heater based on the initial purity; operating the system after adjusting the air source and/or heater; returning the air source and heater to the default condition; measuring a recovered purity of NEA exhaust; and determining whether the recovered purity is within tolerance. If the recovered purity is within tolerance, system operation is terminated. If the recovered purity is not within tolerance, the steps are repeated.

12 Claims, 6 Drawing Sheets

(51) Int. Cl.
*B01D 63/02* (2006.01)
*B01D 53/22* (2006.01)
*B01D 53/30* (2006.01)
*B64D 13/06* (2006.01)

(52) U.S. Cl.
CPC ........ *B64D 13/06* (2013.01); *B01D 2053/224* (2013.01); *B01D 2256/10* (2013.01); *B01D 2259/4575* (2013.01); *B64D 2013/0677* (2013.01); *B64D 2013/0685* (2013.01)

(56) References Cited

U.S. PATENT DOCUMENTS

| | | | |
|---|---|---|---|
| 4,838,902 A | 6/1989 | Lomax | |
| 6,770,116 B2 | 8/2004 | Kojima | |
| 7,013,905 B2* | 3/2006 | Jones | G05D 11/138 137/12 |
| 7,352,464 B2* | 4/2008 | Chen | G01N 21/3504 356/437 |
| 7,410,529 B2 | 8/2008 | Sellers et al. | |
| 7,465,337 B2 | 12/2008 | Gaertner et al. | |
| 7,951,228 B2 | 5/2011 | Lemaitre et al. | |
| 8,241,403 B2 | 8/2012 | Tadrous et al. | |
| 8,404,011 B2 | 3/2013 | Doring | |
| 8,667,977 B1* | 3/2014 | McCaul | F04F 1/18 137/209 |
| 10,022,663 B2* | 7/2018 | Thibaud | A62C 99/0018 |
| 2004/0112218 A1 | 6/2004 | Steiner | |
| 2004/0194848 A1 | 10/2004 | Sauer | |
| 2004/0244585 A1 | 12/2004 | Meckes et al. | |
| 2005/0286054 A1* | 12/2005 | Chen | G01N 21/3504 356/437 |
| 2007/0000380 A1 | 1/2007 | Leigh et al. | |
| 2008/0060523 A1 | 3/2008 | Tom et al. | |
| 2009/0166358 A1 | 7/2009 | Bose | |
| 2014/0208943 A1 | 7/2014 | Gupta | |
| 2014/0331857 A1* | 11/2014 | Massey | B64D 37/32 95/8 |
| 2016/0107116 A1* | 4/2016 | Metrulas | B01D 53/30 95/8 |
| 2017/0014749 A1* | 1/2017 | Thibaud | A62C 99/0018 |

OTHER PUBLICATIONS

Zhang, B., et. al., Study on Fouling and Cleaning of PVDF Membrane, CCSE Journal, vol. 3, No. 11, Nov. 2009.

* cited by examiner

ON-BOARD INERT GAS GENERATING AIR SEPARATION MODULE RECOVERY APPARATUS AND METHOD

FIELD OF THE INVENTION

The present invention generally relates to an on-board inert gas generating system air separation module recovery apparatus and method for aircraft, and more particularly relates to a recovery apparatus and method that implements an adjusted airflow temperature and flow rate regime to recover air separation efficiency.

BACKGROUND

To decrease the probability of combustible or flammable materials within a fuel tank of an aircraft, current on-board inert gas generating systems ("OBIGGS") typically comprise an air separation module ("ASM") having a hollow-fiber membrane designed to produce and deliver a volume of nitrogen within the fuel tank's ullage. The increased percentage of nitrogen operates to reduce the concentration of combustible gases in the ullage and thereby, reduce the combustibility of the combined gasses. Typical OBIGGS utilize engine bleed air as the supply of pressurized inlet air for inert gas generation. However, over time, contaminants that are carried by that bleed air from the aircraft engines tend to build up and cause a drop in ASM performance that may eventually lead to system failure. Some of these contaminants may chemically react with the fiber material in such a way that the reaction results in permanent physical damage to the fiber material. Other contaminants (e.g., heavy hydrocarbons, oils, etc.) may condense within the hollow-fiber membrane so as to cause a reduction in available fiber surface area available to enable gas separation. When such a reduction in ASM performance occurs, performance may be recovered by removing the condensed contaminants from the surface of the hollow-fiber membrane.

To remove condensed contaminants, chemical cleansing methods, back-pulsing methods, and flashing methods have each been used in the past. However, these methods have been used on hollow-fiber membranes of ASMs designed for industrial and water filtration applications and not for OBIGGS operating aboard aircraft. As a result, such methods have been found to be difficult to implement on ASMs designed for the OBIGGS installed on aircraft due to contamination risks to other aircraft systems, uncertainty of the hollow-fiber membrane tolerances to cleaning agents and an inability to adequately perform cleaning methods on the installed ASM.

It is therefore an object of the present invention to address the disadvantages of these methods and further address the need for an efficient and reliable method to improve ASM performance on an OBIGGS unit.

SUMMARY

In view of the above disadvantages of prior art ASM recovery methods, an embodiment of an ASM recovery method for returning a contaminated ASM back to an acceptable performance level may comprise:
 a) operating the recovery system with the air source and heater in a default condition;
 b) measuring an initial purity of NEA exhaust;
 c) adjusting at least one of the air source and heater based on the measured initial purity of the NEA exhaust;
 d) operating the recovery system after adjusting at least one of the air source and heater;
 e) returning the air source and heater to the default condition;
 f) measuring a recovered purity of the NEA exhaust; and
 g) determining whether the recovered purity is within predetermined tolerances; wherein:
  i) if the recovered purity is within predetermined tolerances, terminating operation of the recovery system; or
  ii) if the recovered purity is not within predetermined tolerances, repeating steps c)-g).

The method may further comprise the step of shutting down one or more aircraft systems prior to step a) and maintaining the aircraft systems without power until step g) i. The method may also further comprise connecting the ASM to the inlet and outlet connectors of the recovery system prior to step a) and isolating the ASM from other aircraft systems.

In one aspect of the invention, the recovery system may be incorporated within an aircraft on-board inert gas generating system (OBIGGS) wherein the default condition mimics standard OBIGGS operating conditions.

In a further aspect of the present invention, each of the initial purity and recovered purity may be measured with an oxygen sensor and the step of operating the recovery system after adjusting at least one of the air source and the heater is for a predetermined period of time before returning the air source and heater to the default condition.

In another aspect of the present invention, the step of adjusting at least one of the air source and heater based on the measured initial purity of the NEA exhaust includes adjusting the air source to output an adjusted air flow rate about 1× to about 5× greater than the default air flow rate. More particularly, the adjusted air flow rate may be about 2× to about 3× greater than the default air flow rate. In a further aspect, the step of adjusting at least one of the air source and heater based on the measured initial purity of the NEA exhaust includes adjusting the heater to output heated air having an adjusted air temperature between about 100° F. and about 300° F. And more particularly, the adjusted air temperature may be between about 200° F. and about 250° F.

In accordance with a further aspect of the present invention, an apparatus for recovering air separation performance of an air separation module (ASM) may comprise: a) an air source configured to provide an air flow of high pressure inlet air to the apparatus; b) a filter configured to filter the inlet air and output clean air; c) a heater configured to heat either the inlet air or clean air; and d) an inlet connector and outlet connector configured to couple with the ASM wherein the heated clean air is delivered into the ASM through the inlet connector and the NEA exhaust is output through the outlet connector. The air source and heater may initially operate in respective default conditions wherein the air source outputs a default air flow rate and the heater outputs heated air having a default air temperature. At least one of the air source and the heater may be adjusted whereby the air source outputs a recovery air flow rate and/or the heater outputs heated air having a recovery air temperature configured to recover the air separation performance of the ASM.

In another aspect of the present invention, the apparatus may further comprise one or more of: a pressure regulating valve downstream from the air source wherein the pressure regulating valve may be configured to regulate an air pressure of the high pressure inlet air; a flow meter downstream of the filter wherein the flow meter may be configured to monitor the flow rate of the clean air output by the filter; a flow control valve upstream of the inlet connector wherein the flow control valve may be configured to regulate the flow rate of the heated clean air delivered into the ASM; a shut off valve upstream of the inlet connector wherein the shut off valve may be configured to prevent air from being delivered into the ASM; and a controller configured to receive feedback signals from the shut off valve and the heater wherein the controller is configured to control, start or end operation of the apparatus to recover the air separation performance of the ASM. The controller may further comprise a user interface to allow manual control of the controller to start, end or manually adjust the apparatus to recover the air separation performance of the ASM.

In accordance with another aspect of the present invention, an apparatus for recovering air separation performance of an air separation module (ASM) may comprise an aircraft on-board inert gas generating system (OBIGGS) and a controller. The OBIGGS may include an air source configured to provide an air flow of a high pressure inlet air comprised of engine bleed air, a filter configured to filter the engine bleed air and output clean air, a heater configured to heat either the engine bleed air or clean air, and the ASM, wherein the ASM comprises a hollow fiber membrane configured to receive the heated clean air and output nitrogen enriched air (NEA) exhaust. The controller may be configured to receive feedback signals from the air source and the heater, wherein the controller is configured to control, start or end operation of the apparatus. The air source and heater may initially operate in respective default conditions wherein the air source outputs a default air flow rate and the heater outputs heated air having a default air temperature. At least one of the air source and the heater may be adjusted by the controller whereby the air source outputs a recovery air flow rate and/or the heater outputs heated air having a recovery air temperature configured to recover the air separation performance of the ASM.

In further aspect of the present invention, the OBIGGS may further include one of more of: a pressure regulating valve downstream from the air source wherein the controller may be configured to control the pressure regulating valve to regulate an air pressure of the high pressure inlet air; a heat exchanger with an air inlet valve and temperature sensor wherein the controller may be configured to control the air inlet valve in response to an output from the temperature sensor; and a dump valve wherein the controller may be configured to control the dump valve whereby recovery exhaust is directed over board through the dump valve during recovery of the air separation performance of the ASM. The controller may further comprise a user interface to allow manual control of the controller to start, end or manually adjust the apparatus to recover the air separation performance of the ASM These and other features, aspects and advantages of the present invention will become better understood with reference to the following drawings, description and claims.

BRIEF DESCRIPTION OF DRAWINGS

For a more complete understanding and appreciation of this invention, and its many advantages, reference will be made to the following detailed description taken in conjunction with the accompanying drawings.

Corresponding reference characters indicate corresponding parts throughout the several views. The exemplifications set out herein illustrate currently preferred embodiments of the invention, and such exemplifications are not to be construed as limiting the scope of the invention in any manner.

DETAILED DESCRIPTION

Figure 1:
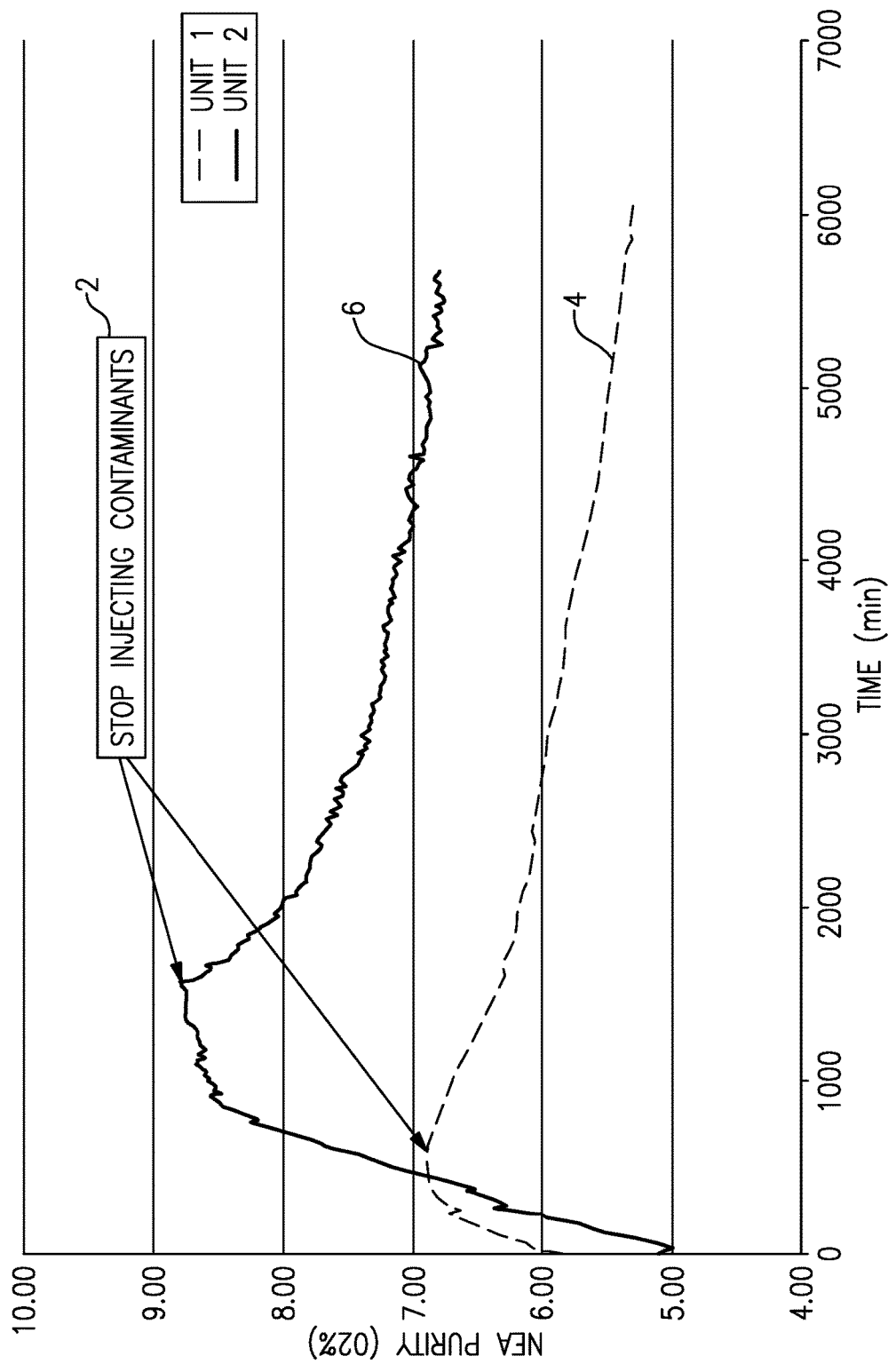
FIG. 1 is a graph of the results of an ASM recovery method comparing NEA purity vs. Time.

An example of the results of a baseline experiment of a prior art ASM recovery method titled "Contamination—Recovery Test" is made with reference to FIG. 1. In this experiment, two similar ASM hollow-fiber membranes (designated as Unit 1 and Unit 2, and curves 4 and 6, respectively) were first subjected to an airflow containing contaminated air analogous to aircraft engine bleed air until noticeable ASM performance degradation was observed. As shown in FIG. 1, decreased ASM performance may be indicated by the initial exponential increase in the observed $O_2$ % before reaching stable equilibrium signifying membrane saturation (an increase in $O_2$ % corresponds to a decrease in $N_2$ %). As illustrated by curves 4 and 6 an ASM receiving contaminated air is increasingly unable to separate unwanted, and potentially ignitable, oxygen from the desired inert nitrogen gas.

As indicated by reference numeral 2, ASM recovery was then initiated by replacing contaminated air (simulated aircraft engine bleed air) with an input of clean air, such as that present within the ambient atmosphere wherein the clean air has been conditioned to be generally free from contamination, such as from such agents as hydrocarbons, dispersed oil droplets, ozone and water vapor. As can be seen in curves 4 and 6, over a substantial time period of about 5000 minutes (83 hours), the ASM units recovered to acceptable performance levels corresponding to operating conditions under clean air airflow. By way of example, and by no means limiting solely thereto, an acceptable performance level may be an $O_2$ % below an end-of-life limit as defined for a specific platform. Typically, an ASM unit is considered corrupt if the $O_2$ % after recovery operations is within about 5% of the defined end-of-life limit. It will thus be appreciated that flowing clean air at normal operating temperature (such as, in an exemplary recovery method, about 160° F.) through a contaminated ASM can take several days to return the ASM to an acceptable performance level.

Figure 2:
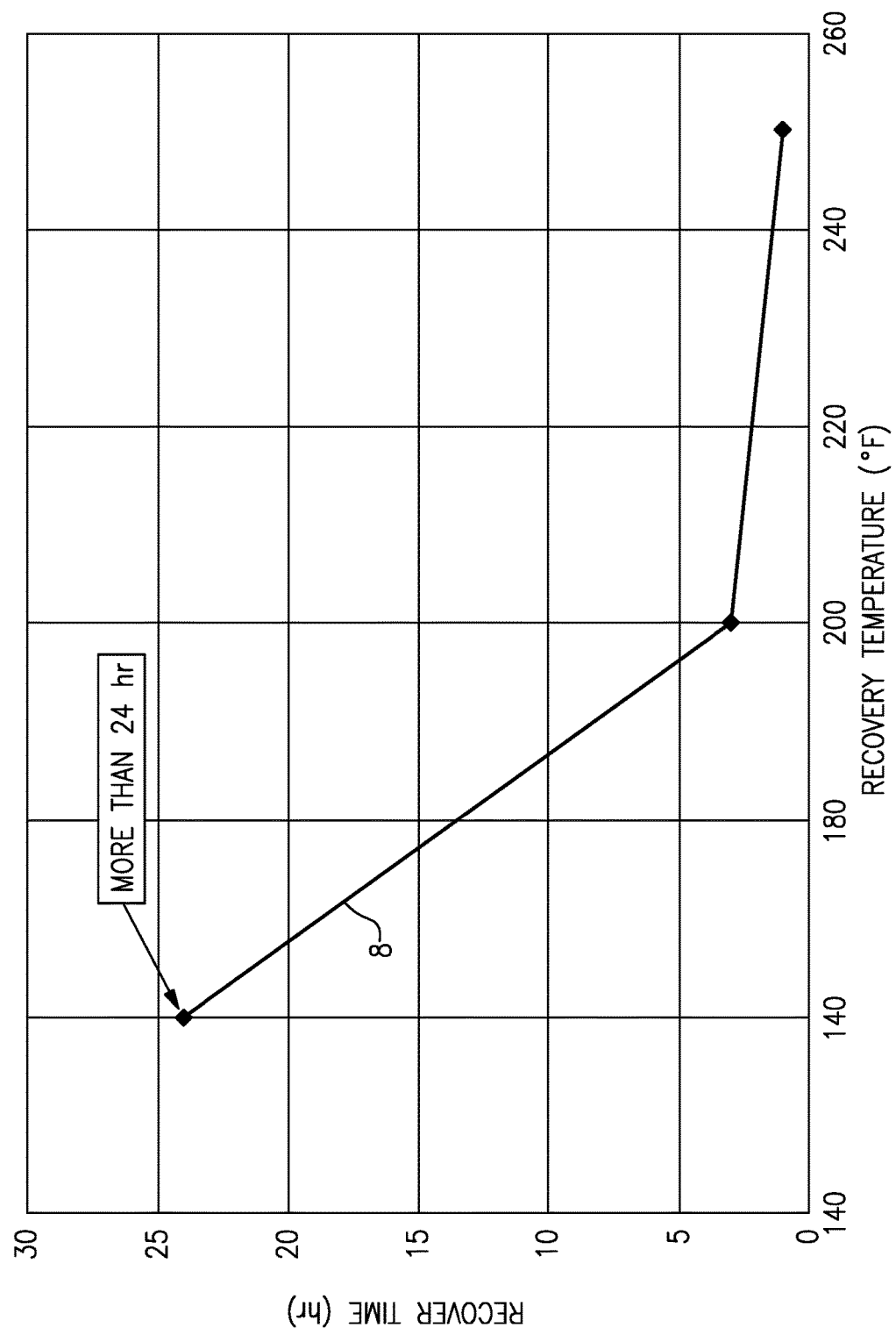
FIG. 2 is a graph of the results of an ASM recovery method comparing Recovery Time vs. Recovery Temperature.

ASM performance recovery time (Y-axis) as a function of the airflow temperature (X-axis) is shown by curve 8 within FIG. 2. An airflow of clean air was supplied to a contaminated ASM at three different temperatures, namely, 160° F., 200° F. and 250° F., and recovery time was subsequently determined for each temperature. As can be seen, as airflow temperature increased, the ASM recovery time decreased. Ultimately, an airflow temperature of 250° F. achieved a recovery time of less than one hour. It was further discovered that increasing the flow rate of the clean air airflow created a synergistic effect that even further reduced recovery time. Thus, an appropriately adjusted temperature and flow rate of the clean air airflow may therefore enable ASM recovery time of one hour or less. It should be noted that higher temperatures may be used, but such temperatures may create undesired risks to the aircraft.

Figure 3:
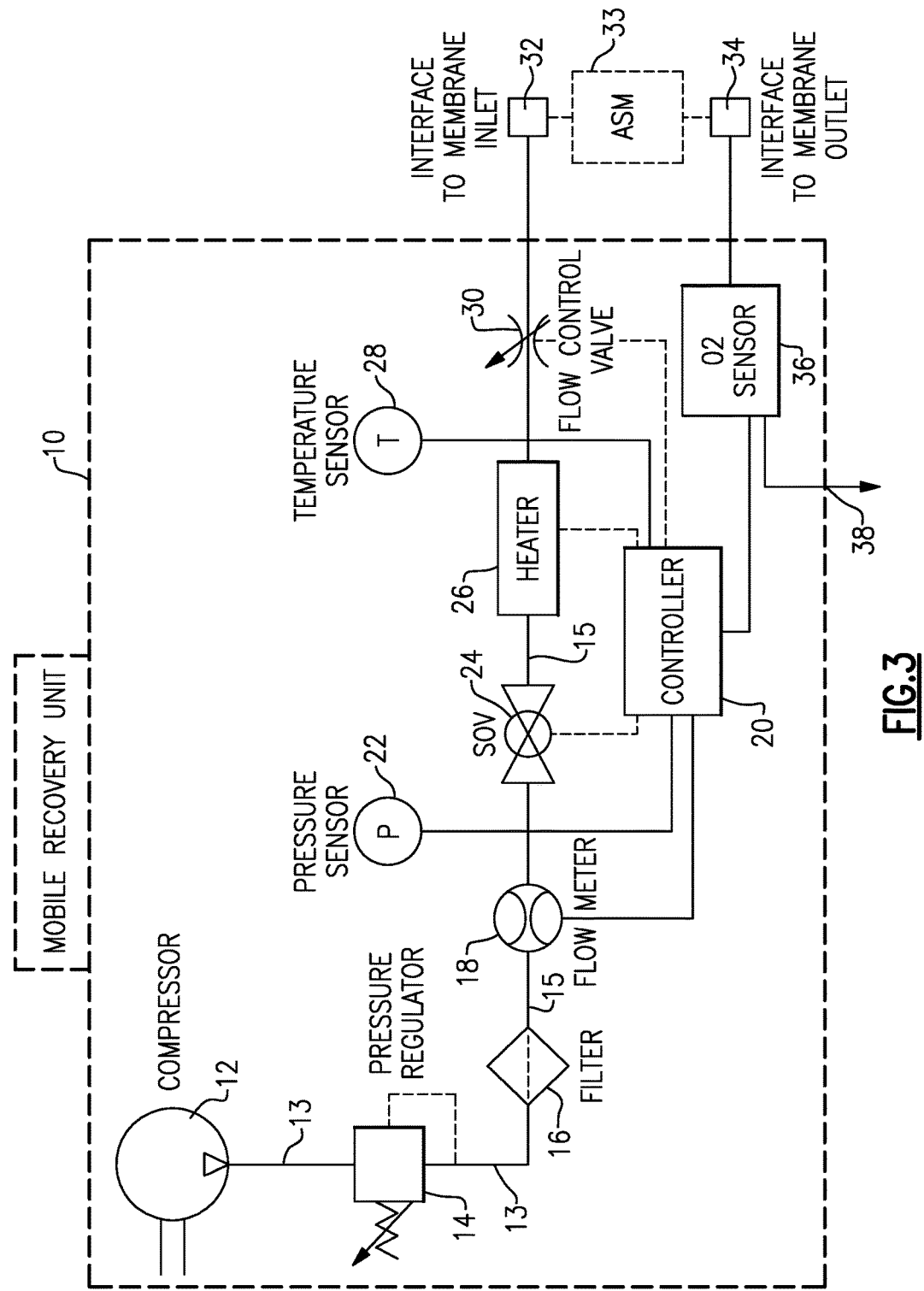
FIG. 3 is a schematic of a stand-alone, mobile ASM recovery system according to an embodiment of the invention.

Referring now to FIG. 3, a schematic of a stand-alone, mobile unit of an ASM recovery system in accordance with an embodiment of the present invention is generally indicated by reference numeral 10. ASM recovery unit 10 may include a compressor 12 which draws a volume of ambient air from the surrounding environment into the recovery unit 10 and compresses the air to create a pressurized airflow of inlet air. A pressure regulator 14 may be positioned downstream from the compressor 12 via air supply line 13. Pressure regulator 14 may be set to a desired pressure level which may be selected so as to correspond to the normal operating pressure of the ASM to be recovered, for example, 30 psig. Downstream from pressure regulator 14 is a filter module 16 adapted to filter the airflow by removing a substantial portion of potential contaminants therefrom so as to output a clean air airflow. Filter module 16 may comprise any number or type of filter, such as but without limitation thereto, a particulate filter, a carbon bed filter, and/or a coalescing filter, for example.

A flow meter 18 may be located downstream from the filter module 16 and be in communication with a controller 20. At least one pressure sensor 22 may also be connected to clean air supply line 15 and be in communication with controller 20. Downstream from pressure sensor 22 and flow meter 18, and in communication with controller 20, are a shut-off valve 24 and heater 26 (e.g., an electric heater). Downstream from the shut-off valve 24 and heater 26, at least one temperature sensor 28 may be connected to clean air supply line 15 and be in communication with controller 20. A flow-control valve 30 downstream from the shut-off valve 24 and heater 26 may also be connected to clean air supply line 15 and be in communication with controller 20.

Downstream from flow-control valve 30 is an appropriate inlet connector 32 which may be used to interface with the membrane inlet of ASM 33. The recovery unit 10 may also comprise an appropriate outlet connector 34 which is used to interface with the membrane outlet of ASM 33. An oxygen ($O_2$) sensor 36 may be coupled to outlet connector 34 and be in communication with controller 20 to measure $O_2$ % within the ASM exhaust and indicate efficiency of air separation of ASM 33 and resultant nitrogen enriched air (NEA) purity. ASM exhaust may then be output through outlet 38. As shown in FIG. 3, solid lines indicate inputs to controller 20 from system components 18 (flow meter), 22 (pressure sensor), 28 (temperature sensor) and 36 ($O_2$ sensor). Dashed lines indicate controller 20 outputs to system components 24 (shutoff valve), 26 (heater) and 30 (flow control valve).

Flow meter 18 (e.g., mechanical, pressure-based, optical, etc.) may function to sense, measure, communicate, and/or record the volumetric flow rate of the filtered airflow of clean air in clean air supply line 15. Pressure sensor 22 (e.g., transducer) may function to sense, measure, communicate, and/or record the pressure of the airflow within clean air supply line 15 while temperature sensor 28 (e.g., thermometer, thermistor, etc.) may function to sense, measure, communicate, and/or record the temperature of the airflow within clean air supply line 15. Heater 26 may function to adjust (raise and/or lower) the temperature of the airflow within clean air supply line 15. Shut-off valve 24 may function to effectively halt the airflow from compressor 12 to inlet connector 32. Flow-control valve 30 may function to adjust the airflow flow rate within clean air supply line 15 while $O_2$ sensor 36 may function to sense, measure, communicate, and/or record the $O_2$ % in the ASM exhaust, with the $O_2$ % being indicative of the purity of the nitrogen enriched air (NEA) output air being exhausted from the ASM unit. It should be understood that the recovery unit 10 may further comprise components that are configured to capture and measure ASM output air samples.

During system operation, controller 20 may receive, monitor, and analyze any communicated data from flow meter 18, pressure sensor 22, temperature sensor 28, and/or $O_2$ sensor 36. Controller 20 may include memory storing look-up tables or other programmed logic whereby controller 20 may then operate to compare and calculate some or all of the received data and automatically determine an appropriate flow rate and temperature for the airflow to achieve the desired ASM recovery rate. Subsequently, controller 20 may then adjust one or both of the clean air airflow temperature and flow rate via heater 26 and flow-control valve 30, respectively. The calculated flow rate and temperature may be based on the measured purity of the ASM exhaust. As such, over a time period, controller 20 may be programmed to periodically adjust the airflow flow rate and/or temperature according to the communicated measured purity. Such periodic adjustments may occur until the measured purity reaches a level deemed to be a full recovery or until the completion of a predetermined time period. As discussed above, a "full recovery" may be platform specific such that the final purity following one or more recovery cycles should be below the end-of-life limit defined for that particular ASM and platform.

It should also be understood that controller 20 may or may not make all calculations and/or determinations based on the characteristics measured from an operatively connected ASM. It should be further understood that controller 20 may be configured to detect when the hollow-fiber membrane of an ASM may be plugged or damaged. In certain circumstances, for example, when the measured temperature of the airflow is at an unsafe level, such as an elevated temperature which may damage the structural integrity of the ASM materials for example, or an operator command has been provided, controller 20 may implement shut-off valve 24 to completely halt the airflow before damaging any downstream system components (i.e. heater 26, flow-control valve 30, clean air supply line 15, etc.) and/or connected ASM unit 33.

In certain instances, such as, but not limited to, when the recovery unit 10 does not include pressure sensor 22 and/or temperature sensor 28, controller 20 may implement various predetermined recovery data profiles or cycle programs that have been stored in the controller memory. Recovery unit 10 may operate under a default condition whereby an initial ASM exhaust purity may be measured (such as via $O_2$ sensor 36). Controller 20 may be programmed to periodically adjust the airflow rate and/or temperature depending on the recovery data profiles or cycle programs, the parameters of such adjustments being derived from the measured initial ASM exhaust purity.

Figure 4:
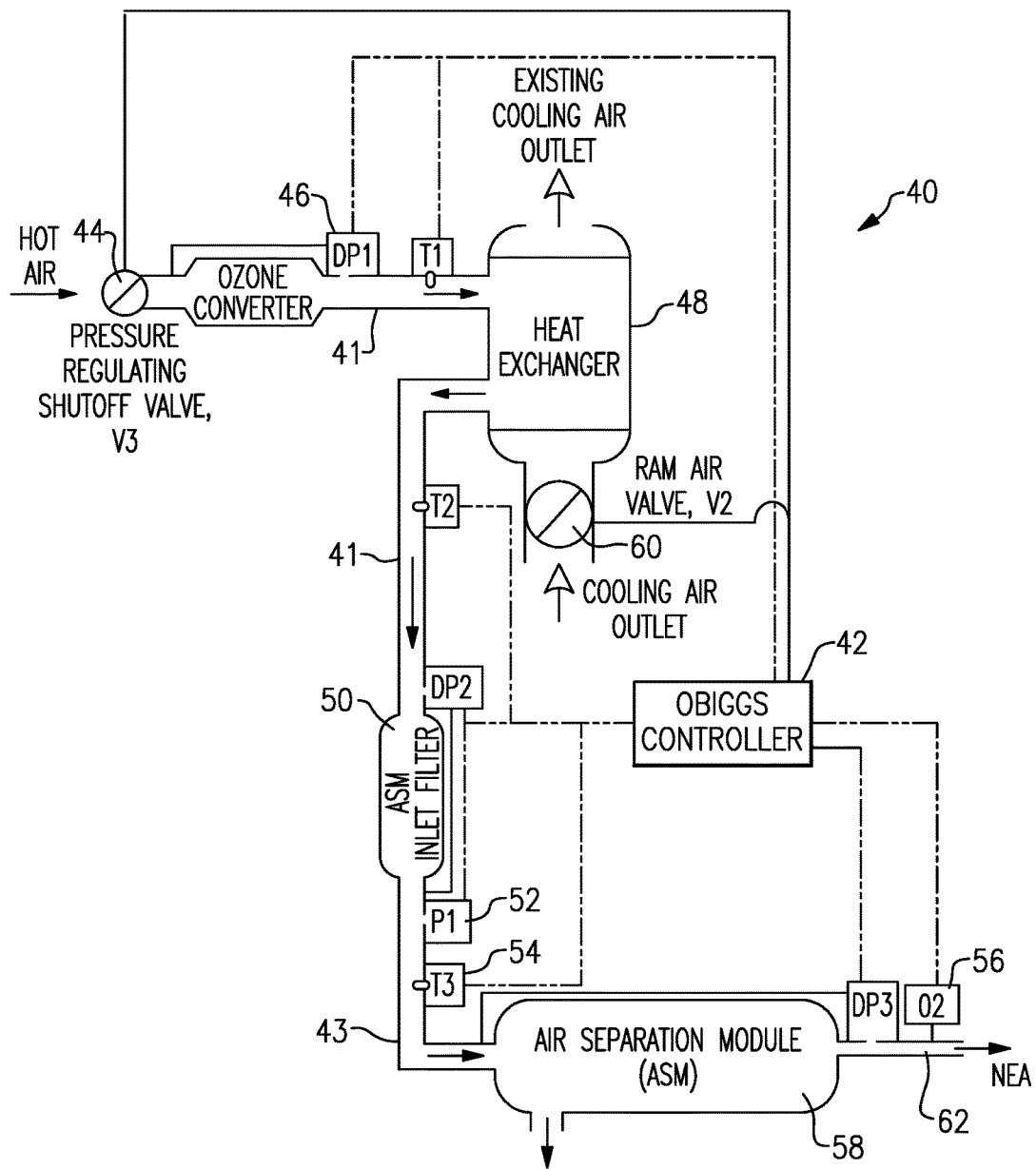
FIG. 4 is a schematic of an embodiment of an ASM recovery system integrated into an OBIGGS system.

Turning now to FIG. 4, FIG. 4 illustrates an ASM recovery system 40 which may be integrated into the OBIGGS of an aircraft. An example of an OBIGGS unit is shown and described within commonly owned U.S. Pat. No. 6,997,970, the entirety of which is hereby incorporated by reference. OBIGGS 40 generally comprises an OBIGGS controller 42 which may have a pre-installed recovery cycle program stored within the controller logic. The recovery cycle program may allow controller 42 to operate an ASM recovery cycle when the aircraft is on the ground with at least one engine operating. An aircraft operator (e.g., a pilot, grounds crew or maintenance worker) may initiate the recovery cycle by implementing one or more commands to begin operation of the ASM recovery cycle program.

OBIGGS 40 may include a pressure regulating/shutoff valve 44 ("pressure regulator") in communication with controller 42 and which may be positioned at the entrance of the OBIGGS supply line 41. When at least one aircraft engine is running, pressure regulator 44 may be adjusted to allow an inlet air of bleed air from the aircraft engine(s) (likely contaminated air containing among other things, water vapor, ozone, hydrocarbons, and fine particulates) to enter OBIGGS 40 at a selected pressure. Pressure regulator 44 may also halt the airflow of the inlet air if the airflow pressure reaches or exceeds a predetermined pressure threshold so as to ensure that supply line 41 and/or any OBIGGS components are not damaged.

Downstream from pressure regulator 44 and in communication with controller 42 may be a pressure drop flow sensor 46 configured to measure the pressure drop of the airflow after the bleed air passes through ozone converter 45. Downstream from flow sensor 46 may be heat exchanger 48. Temperature sensors 47 and 49, positioned before and after heat exchanger 48, respectively, may be used to determine the efficiency of the heat exchanger. In this manner, scheduled maintenance activities may be eliminated if sensors 47, 49 indicate no heat exchange efficiency problems. Downstream from heat exchanger 48 is ASM inlet filter 50 which may be adapted to filter the inlet air airflow by removing a substantial portion of potential contaminants, such as heavy hydrocarbons, oils, etc. so as to output clean air for delivery to ASM 58 via clean air supply line 43. Pressure drop flow sensor 51 may monitor the pressure drop of the airflow through inlet filter 50. Downstream from inlet filter 50 and in communication with controller 42 may be at least one pressure sensor 52 and at least one temperature sensor 54 configured to measure the pressure and temperature of the clean air airflow within clean air supply line 43 that is entering ASM 58. Pressure drop flow sensor 59 may monitor the pressure drop of the airflow through ASM 58 while $O_2$ sensor 56 may monitor the percent oxygen ($O_2$ %) of the ASM exhaust. As described above, the $O_2$ % correlates to the $N_2$ % within the ASM exhaust.

In one aspect of the present invention, heat exchanger 48 may comprise a ram air valve 60 in communication with controller 42 such that heat exchanger 48 may convectively adjust the temperature of the bleed air airflow within the OBIGGS as indicated by comparing air temperatures recorded before (temperature sensor 47) and after (temperature sensor 49) the bleed air airflow passes through heat exchanger 48. In a further aspect of the invention, rather than utilizing ram air valve 60, a bypass valve (not shown) may be installed on supply line 41 at a location near heat exchanger 48. In such instance, the bypass valve is configured to adjust the temperature of the inlet air airflow of engine bleed air within the OBIGGS by adjusting the airflow through heat exchanger 48. Finally, $O_2$ sensor 56 may function to sense, measure, communicate, and/or record the purity of the ASM exhaust (i.e., NEA output air). It should be understood that OBIGGS 40 may further comprise components configured to capture and measure the ASM exhaust samples.

During system operations, as indicated by dashed lines, controller 42 may receive, monitor, and analyze any communicated data from the system components, such as pressure regulator 44, flow sensors 46, 51 and 59, temperature sensors 47, 49 and 54, pressure sensor 52, $O_2$ sensor 56, and ram air valve 60. Depending upon system conditions as indicated by component data, controller 42 may then initiate a recovery cycle. The recovery cycle may be initiated manually by an aircraft operator (e.g., pilot, grounds crew or maintenance personnel) or may be automatically initiated by controller 42 as determined by stored logic within the controller memory. The recovery cycle may operate until ASM air separation recovery has achieved a predetermined NEA purity, or the cycle may operate for a predetermined period of time. It should be noted that the ASM exhaust is typically released from the aircraft downstream from $O_2$ sensor 56 and may be released by a dump valve (not shown) or by disconnecting the outlet 62 of ASM 58 from all other aircraft systems and directing the ASM exhaust to atmosphere. In this manner, any output air generated through the course of the recovery cycle is not injected into the aircraft's fuel tanks.

Figure 5:
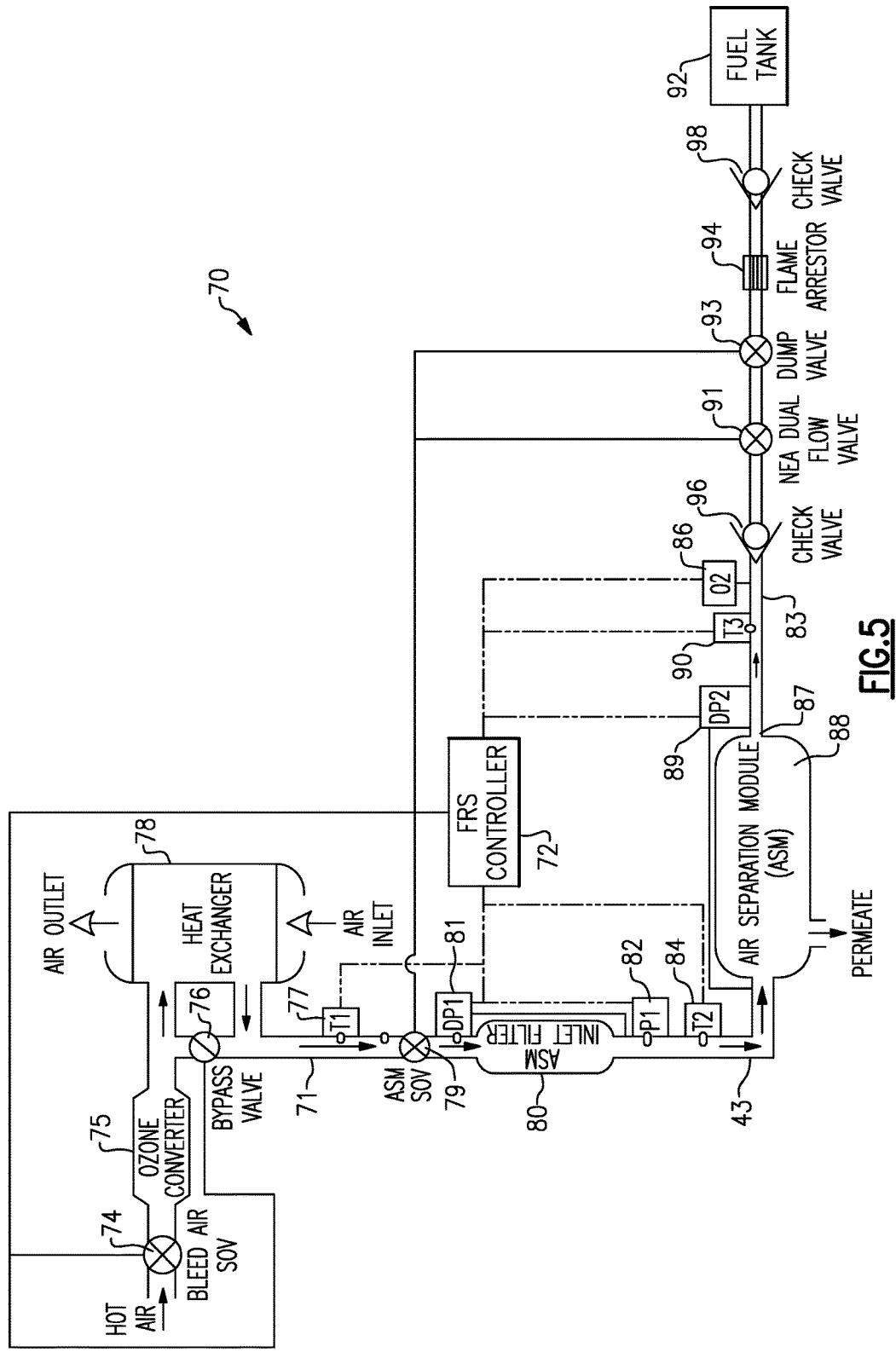
FIG. 5 is a schematic of an alternative embodiment of an ASM recovery system integrated into an OBIGGS system.

Turning now to FIG. 5, an alternative embodiment of an ASM recovery system integrated into an OBIGGS is generally indicated by reference numeral 70. OBIGGS with ASM 70 includes a flammability reduction system (FRS) controller 72 that may have a pre-installed recovery cycle program in the controller logic. The recovery cycle program may allow FRS controller 72 to operate an ASM recovery cycle when the aircraft is on the ground with at least one engine in operation. An aircraft operator (e.g., pilot) may manually initiate the recovery cycle by implementing one or more commands within FRS controller 72 to begin operation of the ASM recovery cycle program. OBIGGS with ASM 70 may include a bleed air shutoff valve 74 in communication with FRS controller 72 and positioned to receive an inlet air of (contaminated) bleed air from the aircraft's engines and direct such inlet air through OBIGGS supply line 71. Inlet air (engine bleed air) passing through shutoff valve 74 may pass through ozone converter 75 before being directed into heat exchanger 78 or to ASM inlet filter 80 upon operation of bypass valve 76 controlled by FRS controller 72. In either event, temperature sensor 77 measures the temperature of the inlet air before it enters ASM inlet filter 80 and communicates such data to FRS controller 72. An ASM shutoff valve 79 may also be placed in line prior to ASM inlet filter 80 so as to regulate entry of inlet air into ASM 88. Downstream from ASM shutoff valve 79 and in communication with FRS controller 72 may be a flow sensor 81 configured to measure the pressure drop of the airflow through ASM inlet filter 80.

Downstream from ASM inlet filter 80 and in communication with FRS controller 72 may be at least one pressure sensor 82 and at least one temperature sensor 84. Pressure sensor 82 (e.g., transducer) may function to sense, measure, communicate, and/or record the pressure of the airflow of clean air within the clean air supply line 73 while temperature sensor 84 (e.g., thermometer, thermistor, etc.) may function to sense, measure, communicate, and/or record the temperature of the clean air airflow within clean air supply line 73. The clean air is delivered to ASM 88 via clean air supply line 73. Pressure drop flow sensor 89 may monitor the pressure drop of the airflow across ASM 88 while $O_2$ sensor 86 may monitor the percent oxygen ($O_2$ %) of the ASM exhaust. Temperature sensor 90 may function to sense, measure, communicate, and/or record the temperature of NEA exhaust airflow exiting ASM 88 through NEA gas line 83 prior to flow-controlled passage of the NEA gas through dual flow valve 91 and charging of fuel tank 92, if indicated.

A dump valve 93 may be included to dump the airflow should fuel tank 92 not require further inerting or should FRS controller 72 determine, via data received from temperature sensor 90 and/or oxygen sensor 86, that ASM 88 is operating outside acceptable performance thresholds and producing unwanted or dangerous gases. A flame arrestor 94 may be placed between ASM 88 and fuel tank 92 to extinguish any flames that may be generated by a substandard ASM. One or more check valves 96, 98 may also be included so as to prevent backflow of any air within NEA gas line 83. It should be understood that OBIGGS with ASM 70 may further comprise components configured to capture and measure the ASM exhaust (output air) samples.

During system operations, as indicated by dashed lines, FRS controller 72 may receive, monitor, and analyze any communicated data from the system components, such as temperature sensors 77, 84 and 90, flow sensors 81 and 89, pressure sensor 82 and $O_2$ sensor 86. Depending upon system conditions as indicated by component data, FRS controller 72 may then initiate a recovery cycle (e.g., manually by an aircraft operator or automatically as determined by logic stored with controller memory). The recovery cycle may operate until ASM air separation recovery has achieved a predetermined NEA purity, or the cycle may operate for a predetermined period of time, by sending appropriate control signals (indicated generally by solid lines from FRS controller 72) to system components, such as shutoff valve 74, bypass valve 76, ASM shutoff valve 79, dual flow valve 91 and dump valve 93. It should be noted that the ASM exhaust is typically released from the aircraft downstream from $O_2$ sensor 86 and may be released by dump valve 93 or by disconnecting the outlet 87 of ASM 88 from all other aircraft systems and directing the ASM exhaust to atmosphere. In this manner, any output air generated through the course of the recovery cycle is not injected into the aircraft's fuel tanks.

Figure 6:
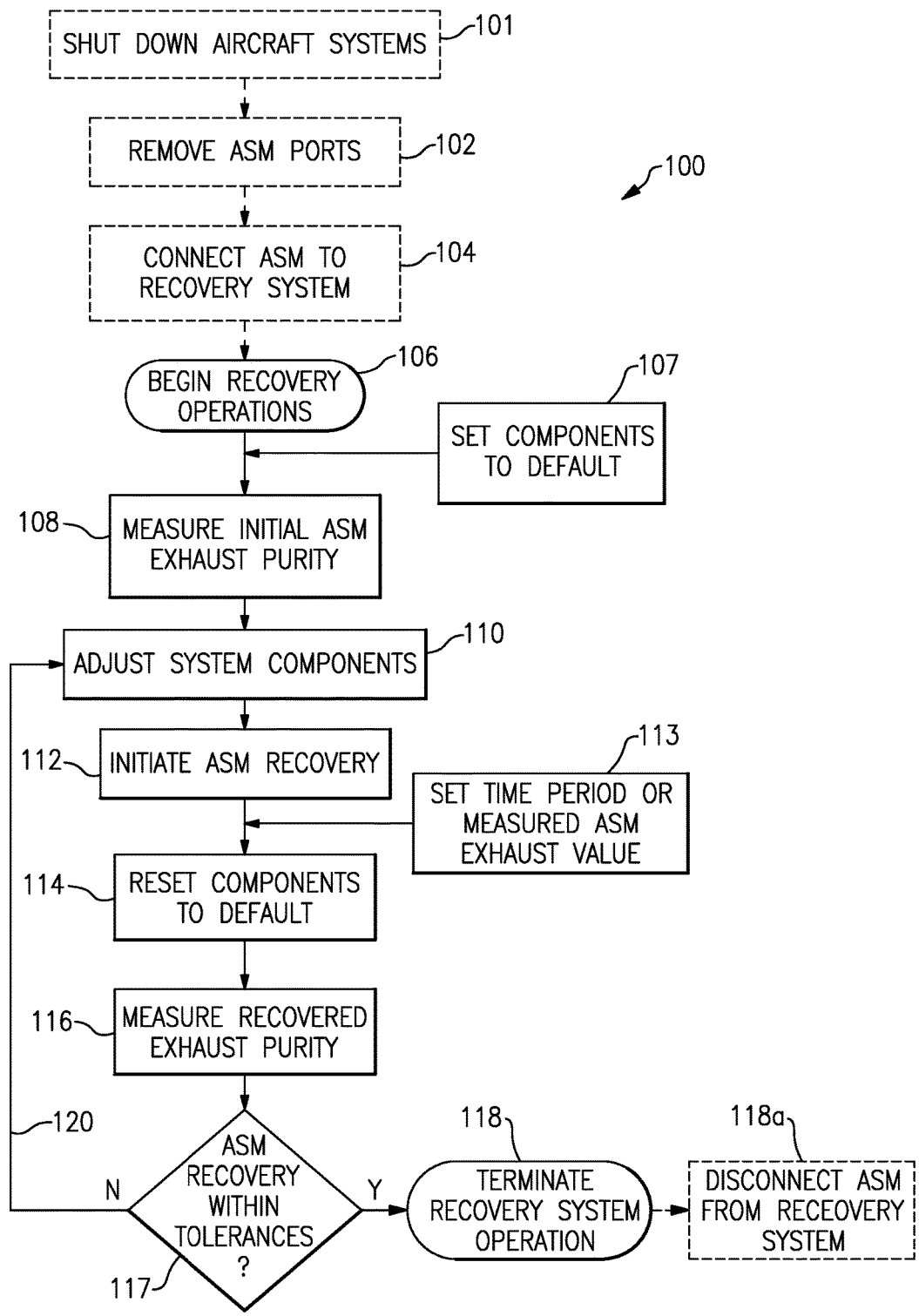
FIG. 6 is a flow chart of an ASM recovery method according to an embodiment of the present invention.

Generally, the steps of a recovery method 100 corresponding to a recovery system is shown in FIG. 6 and discussed as follows. At optional step 101, operations of some or all aircraft systems may be shut down (completed) and maintained without power throughout the remainder of the method. At optional step 102, when necessary, the ASM inlet port and outlet port may be releasably disconnected from the aircraft interface connectors (i.e. isolating the ASM from other aircraft systems). At optional step 104, when employing recovery unit 10, the previously used (i.e., contaminated or depleted) ASM may be releasably connected to recovery system 10, such as through inlet connector 32 and outlet connector 34 as shown in FIG. 3).

Once properly connected, recovery system operation processes may begin at step 106, including setting the recovery system components (e.g., heater 26, heat exchangers 48, 78 and air source regulated by a shutoff valve (e.g., shutoff valve 24 (FIG. 3), pressure regulating/shutoff valve 44 (FIG. 4), shutoff valve 74 (FIG. 5)) to a default condition (step 107). As discussed above, the temperature and pressure default conditions may be platform and ASM specific, and may be, for example, 160° F. and 30 psig, respectively. In one aspect of the invention, this default condition generates or mimics standard OBIGGS airflow operating conditions during flight (e.g., typical bleed airflow flow rate and temperature). At step 108, an initial ASM nitrogen enriched air (NEA) exhaust purity measurement may be made (e.g., via $O_2$ sensor such as sensor 36 (FIG. 3), 56 (FIG. 4) or 86 (FIG. 5)) while the airflow flow rate and temperature at in the default condition.

Once the initial NEA exhaust purity has been measured and communicated to the associated controller (e.g., controller 20 (FIG. 3), 42 (FIG. 4) or 72 (FIG. 5)), at step 110 the system controller 20, 42, 72 may then make, if indicated by the initial purity measurement, one or more adjustments to the heater/heat exchangers and/or air source regulator anticipated to promote full ASM air separation recovery. Such adjustments may be made automatically, be programmed through a previously-stored recovery cycle, or by an operator initiating one or more commands through the controller to set a desired status for the recovery system components. In accordance with an aspect of the present invention, the air source regulator/valve may be adjusted to increase the air flow through the ASM on the order of about 1× to about 5× the default condition, and more particularly, about 2× to about 3× the default condition. The heater may be adjusted to output heated air with a temperature between about 100° F. and 300° F., and more particularly, between about 200° F. and 250° F.

At step 112, the recovery system may then begin ASM recovery operations following adjustments to the airflow temperature and/or flow rate. At step 114, which may occur after a predetermined time period and/or a certain measured NEA exhaust purity value (such as via $O_2$ sensor 36, 56, 86) as set in step 113, the system controller 20, 42, 72 may then adjust the recovery system components to reset the components to their default settings. At step 116, a recovered purity of NEA exhaust may be measured once the system components have resumed operating at the default condition. If the recovered purity is determined by the controller to be within predetermined tolerances (such as more than 10% lower than the defined end-of-life limit) (step 117), operation of the recovery system may be terminated at step 118. During step 118*a*, when necessary, the ASM may be disconnected from the recovery system (i.e. disconnect inlet connector 32 and outlet connector 34 of recovery unit 10 from ASM 33 as shown in FIG. 3). However, if the recovered purity is not within predetermined tolerances, at step 120, system controller 20, 42, 72 may make further adjustments to the recovery system. The cycle comprising steps 112, 114, 116, and 120 may be repeated until the recovered purity is within predetermined tolerances. If the ASM cannot be recovered to output NEA within acceptable purity tolerances, the ASM may need to be discarded and replaced.

It should be understood the steps of the method presented herein do not necessarily have to be in the order in which it is presented. It is also understood that when an element is referred to as being "on", "connected to/with", or "coupled to/with" another element, the element can be directly on, connected to/with or coupled to/with the other element or intervening elements may also be present.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the following claims.

What is claimed is:

1. A method of recovering air separation performance of an air separation module (ASM) via a recovery system, the recovery system including an air source configured to provide an air flow of high pressure inlet air to the recovery system, a filter configured to filter the inlet air and output clean air, a heater configured to heat either the inlet air or clean air, and an inlet connector and outlet connector configured to couple with the ASM, the ASM comprising a hollow fiber membrane configured to receive the heated clean air and output nitrogen enriched air (NEA) exhaust, the method comprising:

a) operating the recovery system with the air source and heater in respective default conditions, wherein the air source outputs a default air flow rate and the heater outputs heated air having a default air temperature;

b) measuring an initial purity of NEA exhaust;

c) adjusting at least one of the air source and heater based on the measured initial purity of the NEA exhaust;

d) operating the recovery system after adjusting at least one of the air source and heater;

e) returning the air source and heater to their respective default conditions;

f) measuring a recovered purity of the NEA exhaust; and g) determining whether the recovered purity is within predetermined tolerances; wherein:

i) if the recovered purity is within predetermined tolerances, terminating operation of the recovery system; or ii) if the recovered purity is not within predetermined tolerances, repeating steps c)-g).

2. The method of claim 1 further comprising shutting down one or more aircraft systems prior to step a) and maintaining the aircraft systems without power until step g) i.

3. The method of claim 1 further comprising connecting the ASM to the inlet and outlet connectors of the recovery system prior to step a).

4. The method of claim 1 further comprising isolating the ASM from other aircraft systems.

5. The method of claim 1 wherein the recovery system is incorporated within an aircraft on-board inert gas generating system (OBIGGS).

6. The method of claim 5 wherein the respective default conditions of the air source and heater mimic standard OBIGGS operating conditions.

7. The method of claim 1 wherein each of the initial purity and recovered purity is measured with an oxygen sensor.

8. The method of claim 1 wherein the step of operating the recovery system after adjusting at least one of the air source and the heater is for a predetermined period of time before returning the air source and/or heater to the default condition.

9. The method of claim 1 wherein the step of adjusting at least one of the air source and heater based on the measured initial purity of the NEA exhaust includes adjusting the air source to output an adjusted air flow rate about 1× to about 5× greater than the default air flow rate.

10. The method of claim 9 wherein the adjusted air flow rate is about 2× to about 3× greater than the default air flow rate.

11. The method of claim 1 wherein the step of adjusting at least one of the air source and heater based on the measured initial purity of the NEA exhaust includes adjusting the heater to output heated air having an adjusted air temperature between about 100° F. and about 300° F.

12. The method of claim 11 wherein the adjusted air temperature is between about 200° F. and about 250° F.

* * * * *